(12) United States Patent
Taxter

(10) Patent No.: US 9,419,417 B1
(45) Date of Patent: Aug. 16, 2016

(54) AUTOMATIC SWITCHING INTERFACE BOX FOR GENERATOR

(71) Applicant: Thomas M. Taxter, Huntington Station, NY (US)

(72) Inventor: Thomas M. Taxter, Huntington Station, NY (US)

( * ) Notice: Subject to any disclaimer, the term of this patent is extended or adjusted under 35 U.S.C. 154(b) by 0 days.

(21) Appl. No.: 14/535,859

(22) Filed: Nov. 7, 2014

Related U.S. Application Data

(60) Provisional application No. 61/903,691, filed on Nov. 13, 2013.

(51) Int. Cl.
 *H02B 1/26* (2006.01)
 *H02B 1/28* (2006.01)
 *H02J 9/06* (2006.01)

(52) U.S. Cl.
 CPC .. *H02B 1/26* (2013.01); *H02B 1/28* (2013.01); *H02J 9/066* (2013.01)

(58) Field of Classification Search
 None
 See application file for complete search history.

(56) References Cited

U.S. PATENT DOCUMENTS

| | | | |
|---|---|---|---|
| 3,808,451 A | 4/1974 | Pittet | |
| 5,268,850 A | 12/1993 | Skoglund | |
| 6,181,028 B1 * | 1/2001 | Kern | H02J 9/06 307/64 |
| 6,365,990 B2 * | 4/2002 | Flegel | H01H 1/58 307/30 |
| 7,471,505 B2 | 12/2008 | Gull et al. | |
| 7,909,642 B1 * | 3/2011 | Czarnecki | H01R 25/006 439/528 |
| 8,367,979 B2 | 2/2013 | Oyler et al. | |
| 8,373,569 B2 * | 2/2013 | Gilpatrick | H04B 3/54 290/28 |
| 8,653,679 B2 * | 2/2014 | Lim | F02B 63/04 290/1 A |
| 2006/0018069 A1 * | 1/2006 | Gull | H02J 3/005 361/90 |
| 2006/0250759 A1 * | 11/2006 | Gull | H02J 3/38 361/601 |
| 2006/0270280 A1 * | 11/2006 | Sodemann | H02J 9/066 439/638 |
| 2011/0175450 A1 * | 7/2011 | Vicari | G05B 15/02 307/62 |

* cited by examiner

Primary Examiner — Courtney Smith
(74) Attorney, Agent, or Firm — Alfred M. Walker

(57) ABSTRACT

An automatic switching interface box for generators in residential dwellings and small commercial applications provides a breaker box transfer switch for generators powering one or more electrical loads. In power blackout situations, the breaker box transfer switch uses a power control relay to keep the load power on, which eliminates the need for a hot generator plug, because the plug in box is not powered. The generator power output cord is plugged onto the male plug of the interface box, or hard wired thereto. If the auxiliary generator had been started and is at rated voltage, the load is immediately and automatically switched from the utility connection to the generator as electrical source. The relay keeps the prongs of the male plug safely unpowered until the generator is attached since the relay coil is powered by the generator output and the plug is connected to the normally open contacts.

12 Claims, 5 Drawing Sheets

AUTOMATIC SWITCHING INTERFACE BOX FOR GENERATOR

RELATED APPLICATIONS

This application claims benefit and priority of provisional application Ser. No. 61/903,691 filed on Nov. 13, 2013, under 35 U.S.C. §119(e), which application is incorporated by reference herein.

FIELD OF THE INVENTION

The present invention relates an automatic switching interface box for generators in residential dwellings and small commercial applications.

BACKGROUND OF THE INVENTION

As auxiliary generators become more popular among homeowners due to increased frequency of major storms causing utility power failures, more attention must be paid to safe methods of interfacing to these devices for the uninitiated.

The prior art shows several approaches to this interface problem. In addition, other patents show the use of a key component of this invention in power source switching applications. U.S. Pat. No. 7,471,505 of Gull shows a single load interface box with one manual double-pole transfer switch. A sliding panel on the box front surface only allows the transfer switch to be in the correct position for load-to-generator connection when the male interface plug prongs for the generator connection are exposed.

U.S. Pat. No. 3,808,451 of Pittet uses a combination of a double-pole double-throw (DPDT) power relay and another double-pole power relay to provide a time delay in switching either to or from a generator to control arcing as well as early connection to a generator before its output voltage is in an acceptable range.

U.S. Pat. No. 5,268,850 of Skoglund relates to a computer controlled automatic power-failure and auxiliary generator control where the generator is automatically started and stopped. The power at various loads is monitored by the control computer and a DPDT power relay is used transfer power as appropriate between the utility and generator.

U.S. Pat. No. 7,909,642 of Czarnecki et al. is an outlet center for connecting multiple loads to an auxiliary power source. A simple hole through the wall of a residence connects an outdoor weather protected wall-mounted outlet box with male generator interface plug to a wall-mounted multiple outlet plate on the corresponding interior wall.

As can be seen, a wide variety of interfacing methods of various costs and convenience have been used to connect one or more loads to auxiliary generators. The present invention can be used safely to supply a single selected load from an auxiliary generator by simply plugging the generator into the interface box. In addition, other methods of use permit powering of multiple loads with the present invention.

OBJECTS OF THE INVENTION

It is therefore an object of the present invention to provide a safe method of using a generator at a residential household due to the need caused by increased frequency of major storms causing utility power failures It is also an object of the present invention to provide an automatic switching interface box for generators in residential dwellings and small commercial applications.

It is yet another object of the present invention to provide an interface for selected loads from an auxiliary generator which can be accomplished by simply plugging the generator into the interface box, while permitting powering of multiple loads with the transfer box of the present invention.

It is also an object of the present invention to minimize the use of unsafe multiple electrical extension cords attached to an exterior generator, to prevent electrical, fire, or tripping hazards.

It is also an object of the present invention to power a multiple loads including an interior convenience outlet string in a room to typically hard-wired appliances such as a furnace, sump pump, well pump, or electric stove, whereby multiple interface boxes can be used, each wired to a different load.

It is yet another object of the present invention to allow a generator to be time-shared between loads by simply moving a single generator output line from one interface box to another.

SUMMARY OF THE INVENTION

In keeping with these objects and others which become apparent, the interface box of this invention is intended to be mounted on any exterior wall of a residence. In a typical home, the garage is most likely to have an exterior wall containing an electric power meter from the utility. Typically, on the interior surface of the same garage wall is the power distribution or breaker box. Thus the exterior garage wall would be the most convenient place for mounting of this interface box since a branch feeder from the breaker box to the interface box and a line from the interface box to the load must be hard wired as per good electrical code practices. Since the interface box is mounted on an external wall, it makes it very inconvenient for a homeowner to place a generator in-use anywhere but outdoors; this is the first safety aspect. Another safety aspect is hard wiring of the interface box precluding the use of extension cords which can be an electrical, fire, or tripping hazard. The single load can be almost anything from an interior convenience outlet string in a room to typically hard-wired appliances such as a furnace, sump pump, well pump, or electric stove. Multiple interface boxes can be used, each wired to a different load. In this manner, a generator can be time-shared between loads such as an outlet string supplying a refrigerator during the day to a furnace used at night. This is done by simply moving the single 120 volt generator output line from one interface box to another. The user does not have to remember to set manual transfer switches one way or another when attaching or removing a generator; there aren't any, thereby rendering use of the present invention super convenient.

Also, multiple auxiliary generators can be used with multiple interface boxes of this invention for simultaneously supplying more than one load.

Although one might balk at the expense of having more than one auxiliary generator, consider the economics of having two generators instead of just one. One can be smaller than the other, or one or both can be inexpensive used purchases. Consider the enhanced availability of some electricity during a power failure through redundancy. If each generator has a probability of failure of 10%, for example, having two generators will insure that at least one will be functional 99% of the time. This too is especially important for the novice since good maintenance and regular testing habits may not yet have been assimilated.

Since most auxiliary generators have multiple 120 volt outlets, by plugging an output line in each one, each of the lines can be simultaneously plugged into different interface boxes of this invention to supply multiply loads without time-sharing from a single generator.

An alternate embodiment of automatic switching interface box is configured with a four prong NEMA L14-30 male plug to permit powering any single 240 volt load such as a well pump or kitchen stove by using a four conductor generator output cord plugged into the single 240/120 volt 30 amp outlet usually available on the auxiliary generator. Alternatively, several 120 or 240 volt loads can be simultaneously served if a sub-panel with branch circuits is connected at the output of this interface box instead of the single load.

While the automatic switching interface box of this invention can be mounted anywhere, it is typically mounted through an exterior home or garage wall. The automatic switching interface box is comprised of an electrical utility box mounted on the interior with a weather resistant enclosure gasketed and attached to the open face of the utility box. The weather resistant enclosure on the outside has a hinged cover which when opened reveals the three prongs of a male plug and a reset button or reset switch handle on a circuit breaker specified to protect the load. The generator power output cord is plugged onto the male plug of the interface box. If the auxiliary generator had been started and is at rated voltage, the load is immediately and automatically switched from the utility connection to the generator as electrical source. Note that this switching action takes place whether during a utility power outage or when utility power is present; therefore, the household can have some loads running on utility power while others are powered by an auxiliary generator if desired. Inside the utility box portion of the interface box, is a DPDT power transfer relay as well as a circuit breaker; note that the relay keeps the prongs of the male plug safely unpowered until the generator is attached since the relay coil is powered by the generator output and the plug is connected to the normally open (NO) contacts. The power plug and circuit breaker are mounted on a panel facing the front of the weather resistant front opening.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Although in different jurisdictions utility household supply may vary in voltage supplied and configuration, the automatic switching interface box of this invention may be modified to accommodate these variations. The invention will be described here as for the single phase 120/240 volt utility power supplied to residences in the USA.

Figure 1:
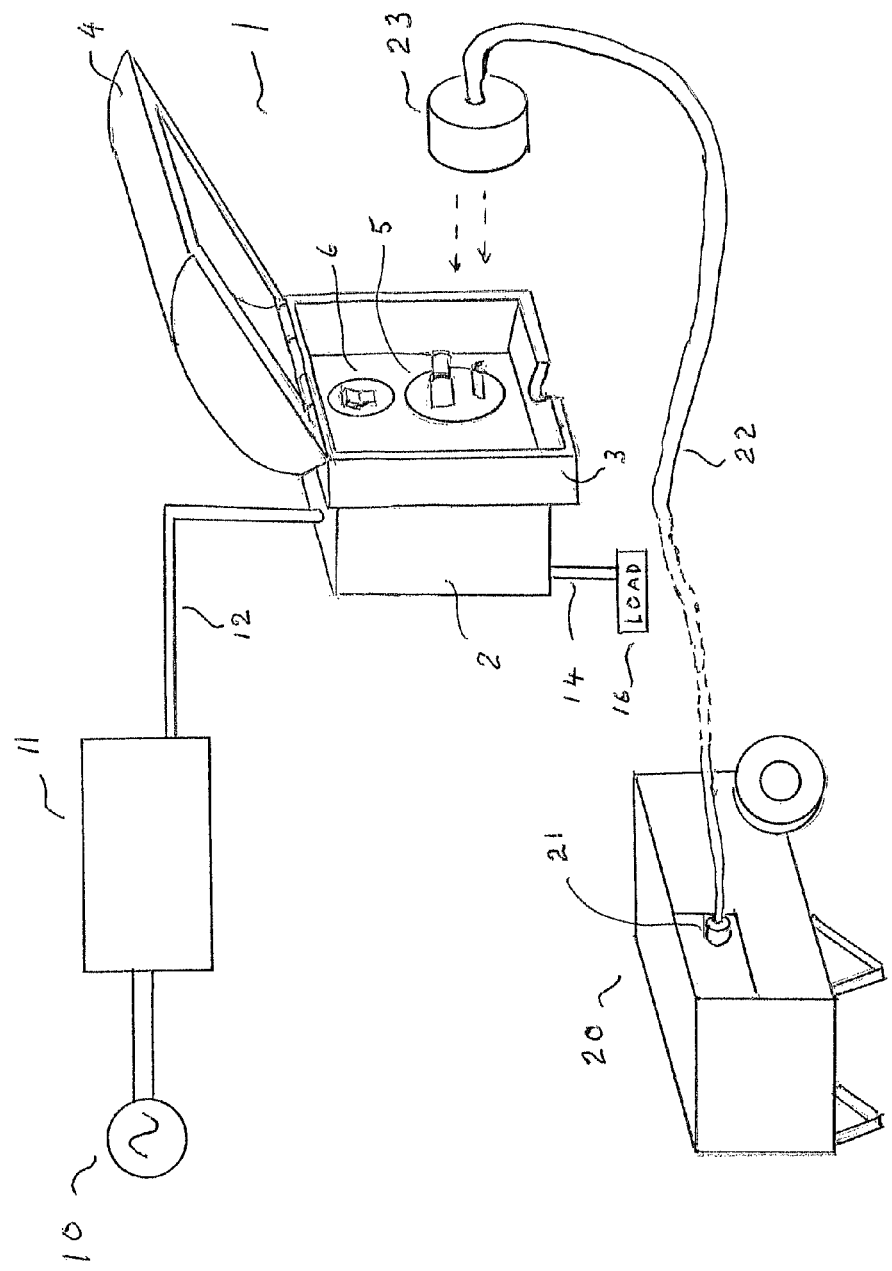
FIG. 1 is a perspective view of the automatic switching interface box of this invention with open cover; an auxiliary generator (at a smaller scale) is also shown.

FIG. 1 shows the automatic switching interface box 1 of this invention with cover 4 open revealing male generator plug 5 and circuit breaker 6 reset switch. Weather resistant housing 3 is attached to the open face of electrical box 2 with mounting screws and sealing gasket (not shown). Utility power input 10 is wired to breaker box 11 with branch supply line 12 hard wired to interface box 1. The load is hard wired via line 14 to load 16. Auxiliary generator 20 with flexible power outlet line 22 plugged in at 21 via a male plug is poised to be plugged onto male plug 5 via female connector 23.

Figure 2:
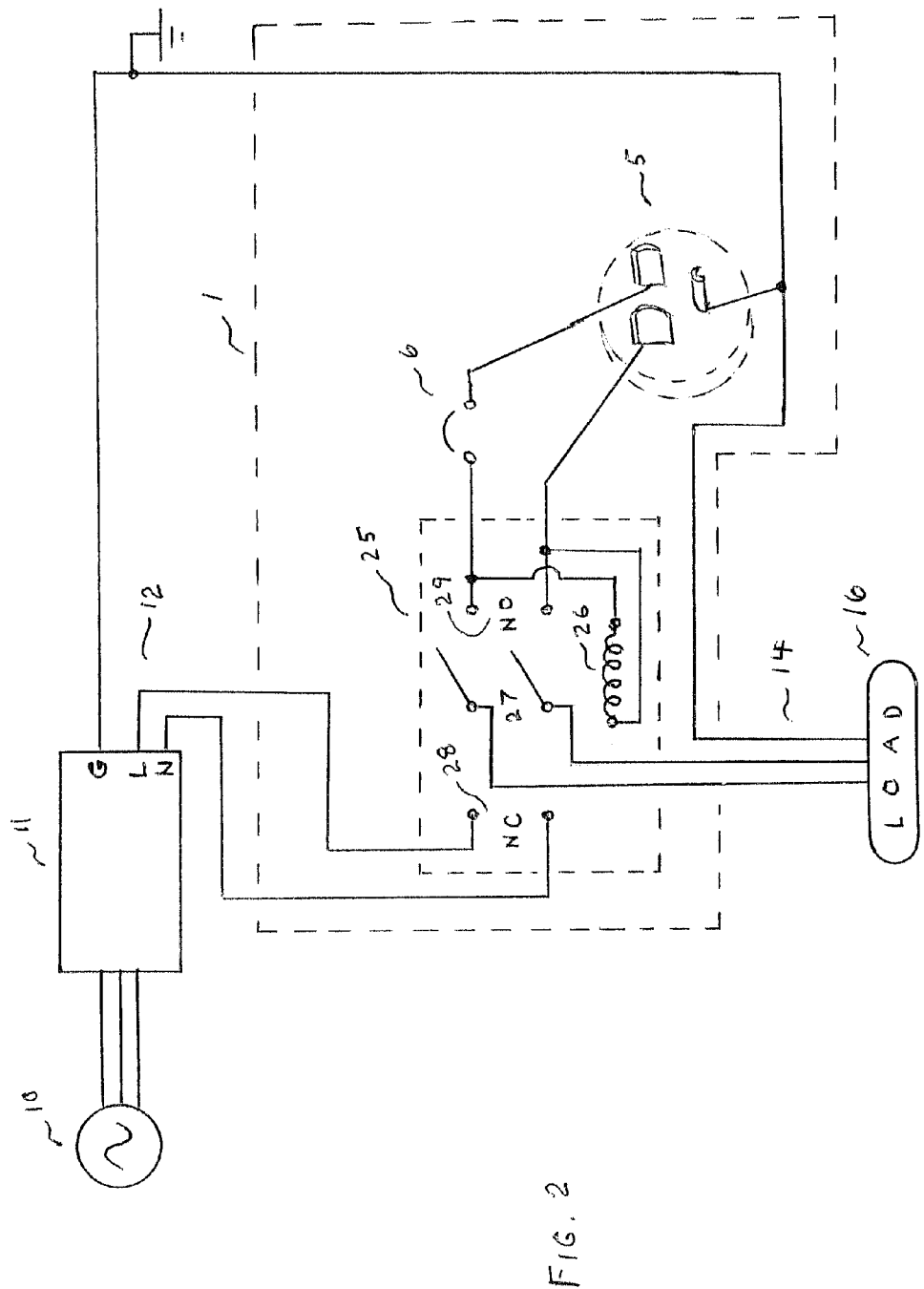
FIG. 2 is a schematic diagram of the interface box.

FIG. 2 is a schematic diagram. Note that clashed lines denote the components within interface box 1 and within DPDT power relay 25 respectively. Note the ground (G), line (L), and neutral (N) branch line 12 as connected to interface box 1. Load 16 is connected via line 14 to ground as well as the common contacts 27 of power switching relay 25. Load and neutral from breaker box 11 are wired to the normally closed (NC) contacts 28 of relay 25. Normally open contacts 29 and coil 26 of relay 25 are wired to prongs of plug 5 through circuit breaker 6. Note that coil 26 is rated at line voltage (120 VAC in USA). When coil 26 is powered by generator voltage through plug 5, contacts 27 are switched automatically from utility power contacts 28 to generator powered contacts 29. When generator is shut down or unplugged, contacts 27 are again connected automatically to utility power (if any is available).

Figure 3:
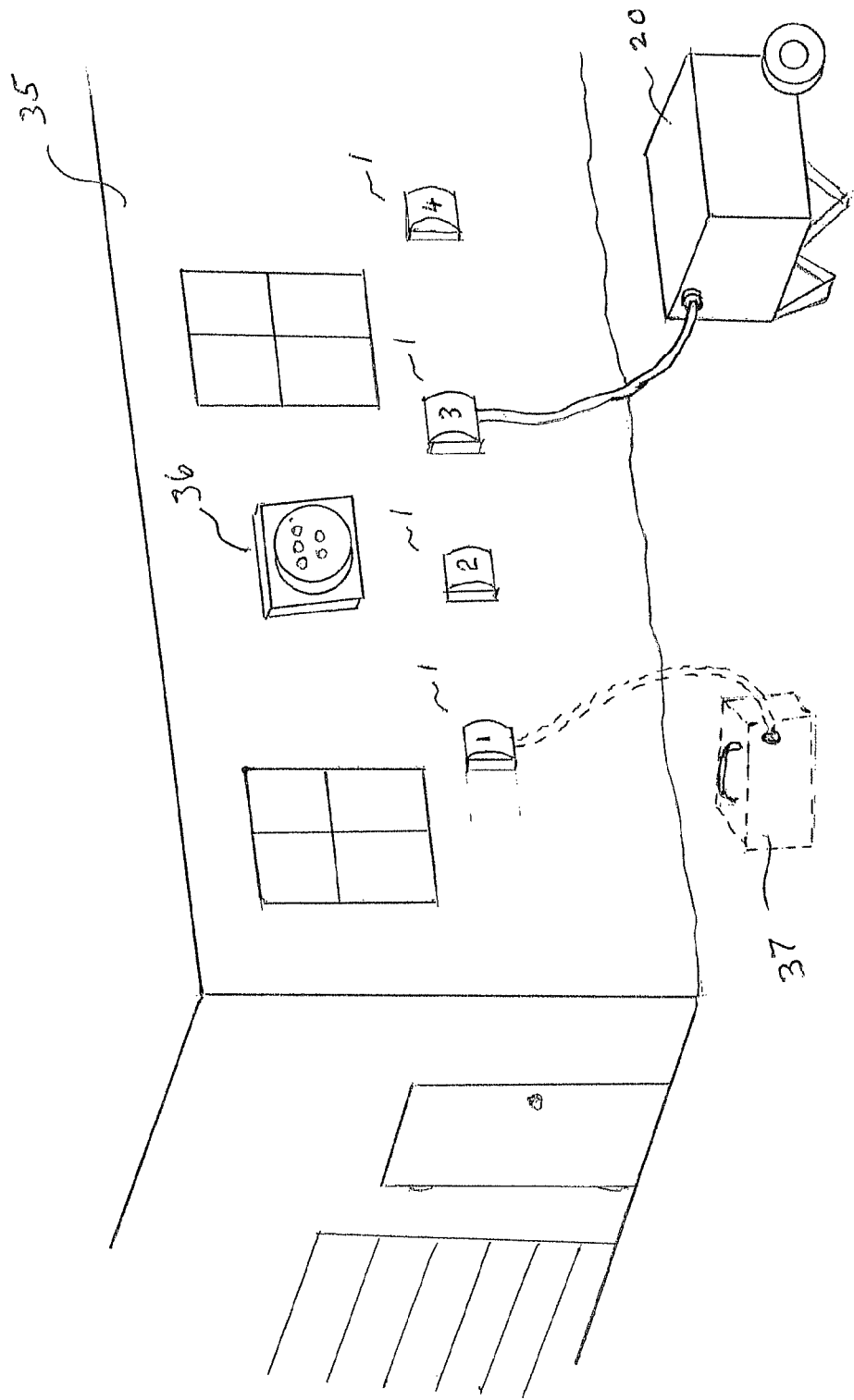
FIG. 3 is a perspective view of the exterior of a garage wall with four mounted interface boxes; one is shown attached to an auxiliary generator while a second is shown attached to a second generator (in phantom lines).

FIG. 3 shows the mounting of four interface boxes 1 on the exterior wall of garage 35 on the same side as utility meter 36. Each of the boxes is attached to a different interior load. Shown here is box #3 attached to auxiliary generator 20. If a different load is desired, generator 20 can be unplugged from box #3 and plugged into 1, 2 or 4. In case a second auxiliary generator is available (such as smaller generator 37), it can be plugged into a different interface box to simultaneously supply that load.

Figure 4:
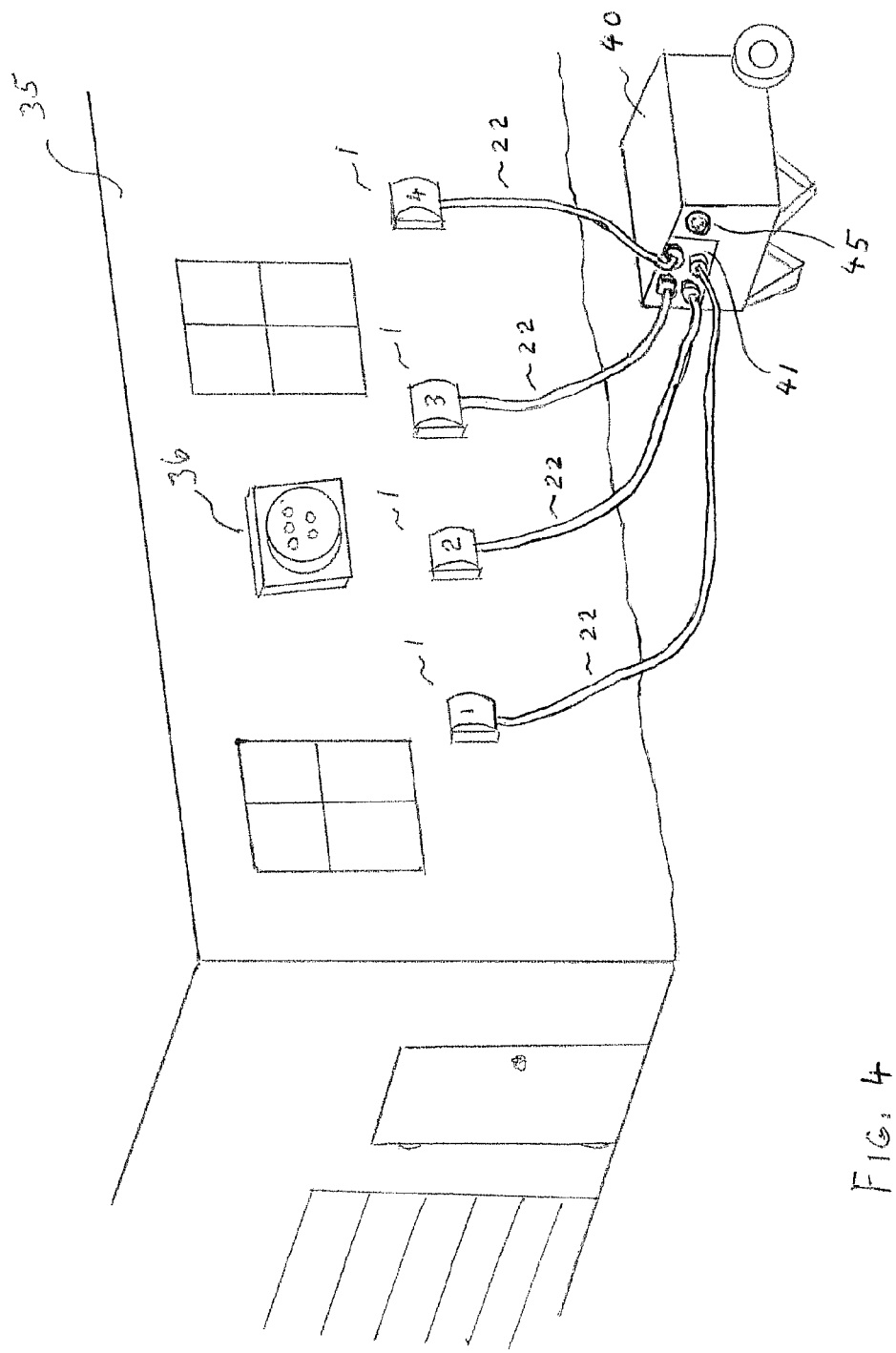
FIG. 4 is a perspective view of the exterior wall as in FIG. 3, but in this case with four power cords plugged into a single auxiliary generator, all four automatic switching interface boxes are powered by a single generator simultaneously.

FIG. 4 shows the same four automatic switching interface boxes of FIG. 3 supplied by a four 120 volt outlet panel 41 on generator 40 via four interface cables 22. In this manner, all interface boxes are supplied from a single generator simultaneously. Any number from 1 to 4 cables 22 can, of course, be used. Also shown (but not used) is a NEMA L14-30 four contact female outlet 45 on generator 40 which can supply 120/240 volts at 30 amps.

Figure 5:
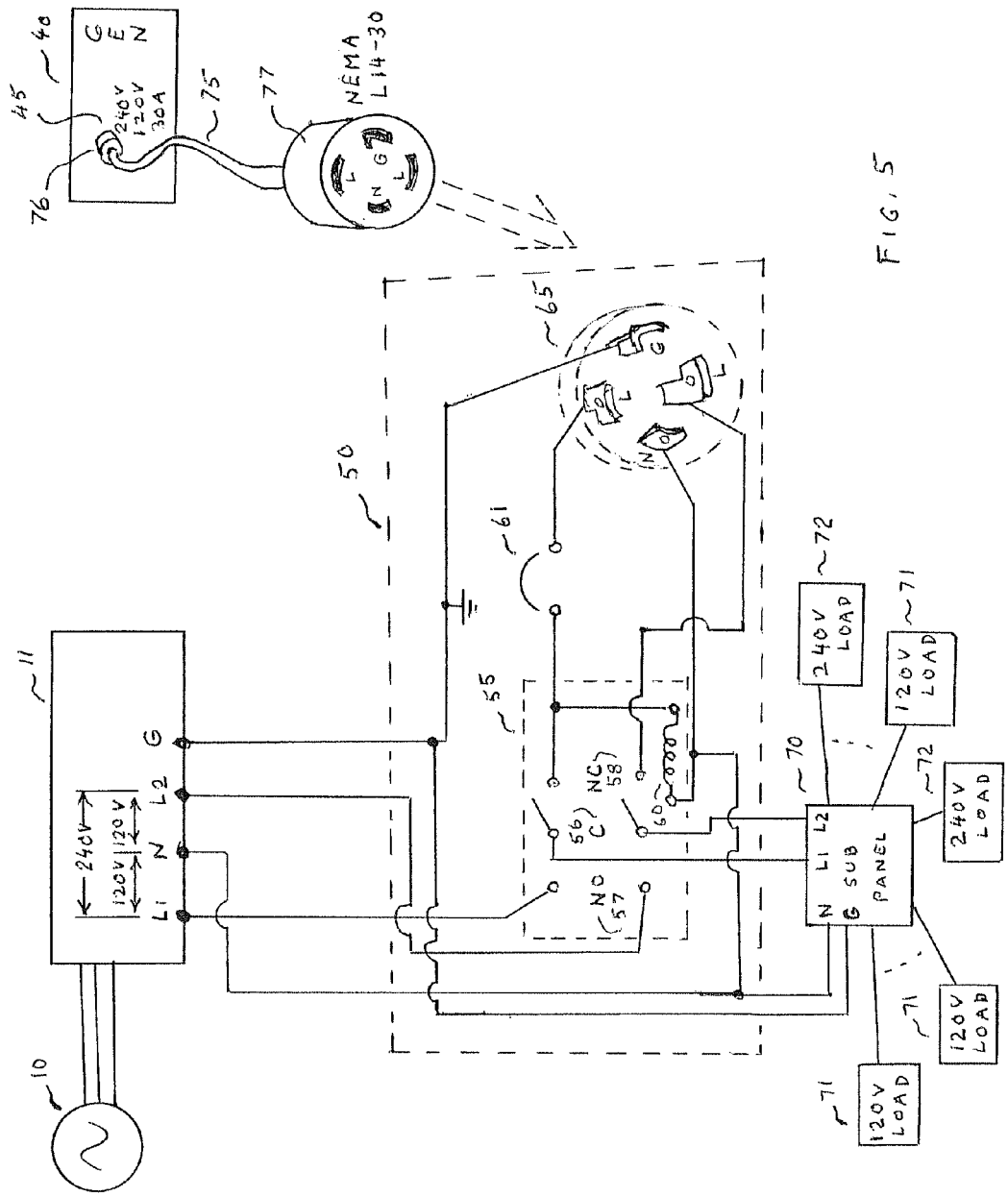
FIG. 5 is a schematic diagram of an alternate embodiment interface box configured with a four prong generator interface plug feeding a sub-panel with multiple branch loads.

FIG. 5 is a schematic diagram of alternate embodiment 50 of the automatic switching interface box using a male four prong plug 65 as an interface to supply a single 240 volt load or the sub-panel 70 as shown which can distribute through branch circuits both to 120 volt loads 71 as well as 240 volt loads 72. A four conductor cable 75 with male plug 76 at the generator 40 end and a female four contact outlet at the interface box 50 is used to connect with the generator 40 using outlet 45. Note that all four outputs (L,N,L,G) of breaker box 11 are used to connect to interface box 50. Here DPDT power relay 55 is configured with contacts rated for 240 volts although coil 60 is still powered by 120 VAC from generator plug 65. Breaker 61 is rated for 240 volts and 30 amps. Power relay 55, NO contacts 57, common contacts 56, and NC contacts 58 function in the same manner as described for the diagram of FIG. 2, however, it is the two line sources (240 volts) that are switched from utility to generator and vice-versa. Note that neither the ground nor the neutral lines are switched. The actual physical features such as electric utility box 2 and weather resistant compartment 3 with cover 4 are still as shown in FIG. 1 for 120 volt automatic switching interface box 1; the main visible difference would be a substitution of four prong plug 65 in box 50 as a substitute for 3 prong plug 5 in box 1.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. An automatic switching interface box for auxiliary generators in residential dwellings and small commercial applications comprising:
    said interface box connected between a utility source of electrical power and a load;
    said interface box containing a relay having an electromagnetic coil and a switch controlled by said coil;
    said switch having a normally closed first position delivering electrical power from said utility source to said load and a normally open second position when said coil is not energized;
    said interface box having a housing containing a male plug with electrical connection to contacts of said second position of said switch in said relay; a breaker box comprising four outputs used to connect the interface box, and said interface box further comprises a circuit breaker electrically connected between the electromagnetic coil and at least one line prong of the male plug having four prongs to switch two line sources (240 volts) between said utility source and the auxiliary generator;
    said auxiliary generator having a generator power output cord terminating in a female plug being connected onto the male plug of said interface box;
    wherein when said male and female plugs are engaged and said auxiliary generator is started and is at rated voltage, said coil is activated causing said switch to move to said second position wherein electric power is delivered from said auxiliary generator to said load by immediately and automatically switching from the utility source to the auxiliary generator for supplying electrical power to said load; and
    whereby said relay maintains prongs of said male plug safely unpowered until the auxiliary generator is attached and powered up.

2. The automatic switching interface box for generators in residential dwellings and small commercial applications as in claim 1 wherein said interface box includes a weather resistant box having a cover covering said male generator plug and a circuit breaker reset switch of the circuit breaker;
    said weather resistant box includes a housing attached to an open face of an electrical box, wherein further utility power input is wired to a breaker box with a branch supply line being hard wired to said interface box, and, said load being hard wired to said breaker box and said interface box.

3. The automatic switching interface box for generators in residential dwellings and small commercial applications as in claim 2 wherein said relay is a double pole, double throw power relay.

4. The automatic switching interface box for generators in residential dwellings and small commercial applications as in claim 3 wherein said load is connected via a line to ground as well as to respective common contacts of said relay.

5. The automatic switching interface box for generators in residential dwellings and small commercial applications as in claim 4 wherein said load and a neutral from said breaker box are wired to normally closed contacts of said relay, while normally open contacts and said coil of said relay are wired to two of the at least one line prongs of said male plug through said circuit breaker.

6. The automatic switching interface box for generators in residential dwellings and small commercial applications as in claim 5 wherein
    when said generator is shut down or unplugged, said coil is deenergized and said load is connected automatically to available utility power.

7. The automatic switching interface box for generators in residential dwellings and small commercial applications as in claim 1 wherein additional interface boxes are employed, each of said interface boxes being attached to a different interior electrical load.

8. The automatic switching interface box for generators in residential dwellings and small commercial applications as in claim 7 wherein if a different interior load requires generator power, said generator female plug is movable from one interface box to another from one of said interface boxes to another of said interface boxes interface box thereby selecting an interior load to receive power during a failure of said utility source.

9. The automatic switching interface box for generators in residential dwellings and small commercial applications as in claim 7 wherein multiple generators are respectively connected to said interface boxes for providing emergency backup power to selected interior loads.

10. The automatic switching interface box for generators in residential dwellings and small commercial applications as in claim 7 wherein said interface boxes are simultaneously supplied generator power by a panel with a plurality of 120 volt outlets on said generator via a plurality of interface cables, whereby all interface boxes are supplied from the generator simultaneously.

11. The automatic switching interface box for generators in residential dwellings and small commercial applications as in claim 2:
    wherein said interface box uses the male plug as an interface to supply either a single 240 volt load or a sub-panel is supplied, which said sub-panel distributes power through respective branch circuits both to 120 volt loads as well as to 240 volt loads;
    wherein further a four conductor cable with a male plug at the generator end and a female four contact outlet at said at least one automatic switching interface box is used to connect with the generator using an outlet, wherein further all of the four outputs (L,N,L,G) of said breaker box are used to connect to said interface box.

12. The automatic switching interface box for generators in residential dwellings and small commercial applications as in claim 11 further comprising:
    a double pole double throw switch configured with contacts rated for 240 volts although the coil powered by 120 VAC from said male generator plug,
    wherein said breaker box is rated for 240 volts and 30 amps, wherein further the two line sources (240 volts) that are switched from the utility to the generator and vice-versa and that neither the ground nor the neutral lines are switched.

* * * * *